Figure 1:
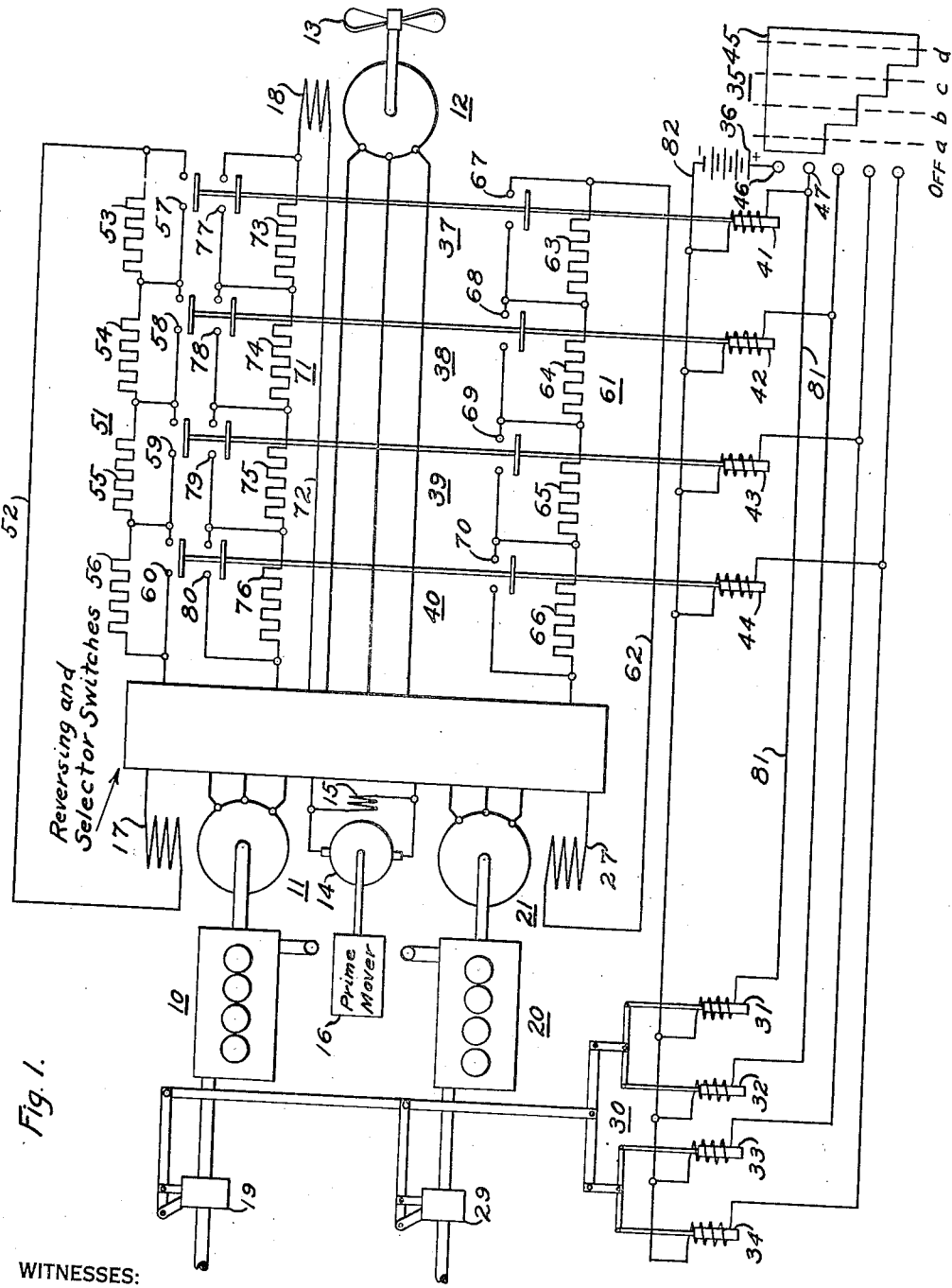

July 16, 1940.  W. SCHAELCHLIN  2,208,393
SHIP PROPULSION STABILITY CONTROL
Filed Sept. 23, 1937  2 Sheets-Sheet 2

WITNESSES:
James F. Young
Leon J. Taza

INVENTOR
Walter Schaelchlin.
BY
Paul E. Friedemann
ATTORNEY

Patented July 16, 1940

2,208,393

UNITED STATES PATENT OFFICE 2,208,393

SHIP PROPULSION STABILITY CONTROL

Walter Schaelchlin, Wilkinsburg, Pa., assignor to Westinghouse Electric & Manufacturing Company, East Pittsburgh, Pa., a corporation of Pennsylvania Application September 23, 1937, Serial No. 165,290

7 Claims. (Cl. 290—4)

This invention relates to control systems for motors and generators and more particularly the invention relates to stability control for a motor and generator or motors and generators utilized in ship propulsion systems.

In power systems where a motor is electrically connected to a generator and the capacity of the motor is somewhere near that of the generator, any variations of load on the motor may very materially change the voltage of the generator. Furthermore, for a constant excitation of the generator, the load variation on the motor may cause the motor to pull out of step or out of synchronism if the motor be a synchronous motor, or drop its load if the motor be an induction motor. This danger of having the motor pull out of step, or drop its load, is particularly great whenever the generator is operated at a variable speed as is the case during maneuvering in ship propulsion systems and whenever a variable speed prime mover drives the generator, and the speed of the motor is determined by the frequency of the supply of the generator.

It would seem at a first and cursory consideration, that if the excitations of both the motor and generator are kept high, an appropriate stability may be maintained regardless of the voltage and frequency variations, but such is not the desirable operation because if the motor and generator are to be operated to be stable for all variations in speed and voltage, the efficiency of the system is very much impaired, since the operation would necessitate a heavy excitation of the generator field, and if a synchronous motor be used, a heavy excitation for both the generator field and the motor field. It is thus desirable that the motor be operated at some point near its pull-out condition and yet not sufficiently near that point to involve dangerous operation.

Heretofore, stability control was obtained by utilizing various means such as means for balancing the load current against the excitation of the interconnected dynamo-electric machines. By installing a reliable stability control system, dynamo-electric machines of smaller capacities may be utilized for a given application than could be utilized for the same application when no stability control is used. For machines above a certain capacity, the cost of stability regulators will compare favorably with the saving obtained by the decrease in capacity of the dynamo-electric machines that may be used for a given application, but for stability regulators used heretofore this saving cannot be obtained when using dynamo-electric machines below a certain capacity.

An object of the invention is to provide means for varying the field strengths of each of a plurality of selectively interconnecteed dynamo-electric machines in relation to the energy supplied to the prime movers that drive the generators of the interconnected dynamo-electric machines.

A further object of the invention is to provide means for maintaining the stability of an electric ship propulsion system by manually operating a plurality of switches that combine the control of energy to the prime movers driving the generators with the control of the field strengths of the interconnected dynamo-electric machines.

A still further object of the invention is to provide means for maintaining the stability of an electric ship propulsion system by automatically varying the field strengths of the interconnected dynamo-electric machines in relation to the energy supplied to the prime movers that drive the generators of the interconnected dyamo-electric machines.

A still further object of the invention is to provide for maintaining the stability of dynamo-electric machines by automatically varying the field strengths of the dynamo-electric machines in relation to the energy supplied to the prime movers for a plurality of predetermined speeds of the prime movers.

In general, it is an object of the invention to provide a method for maintaining stability that may be readily practiced and stability control apparatus that is not only efficient and reliable but also inexpensive to manufacture, install, and operate.

Figure 2:
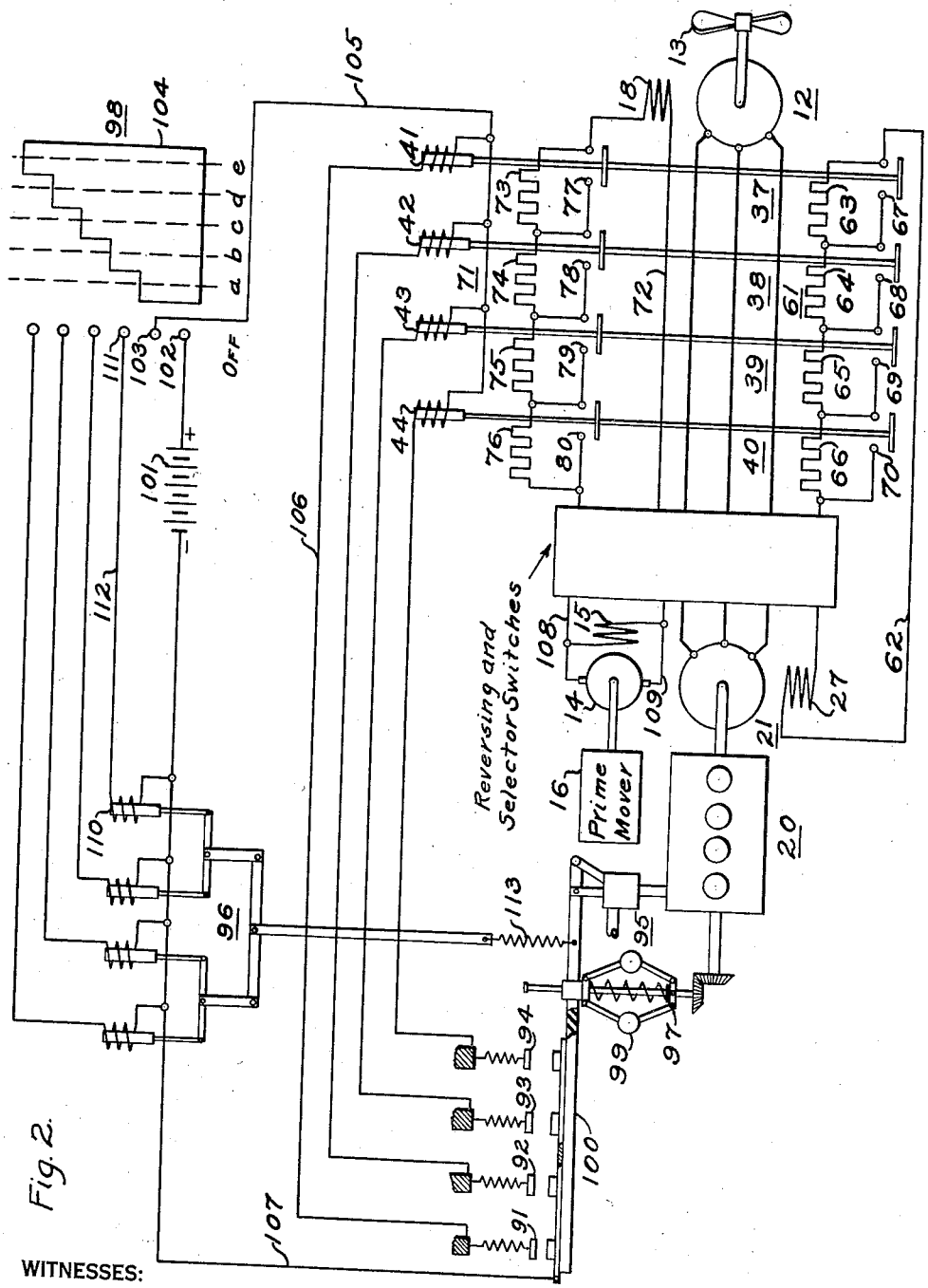

Other objects and advantages not specifically hereinbefore stated will become more apparent from the following specification and claims appended thereto when considered in conjunction with the accompanying drawings, in which:

Figure 1 is a diagrammatic showing of an embodiment of my invention utilizing manual control; and, Fig. 2 is a diagrammatic showing of a modification of my invention utilizing automatic control.

Referring more particularly to Figure 1 of the drawings, the reference characters 10 and 20 schematically designate variable speed prime movers, as internal combustion engines mechanically connected to drive synchronous generators or alternators 11 and 21, respectively, which generate alternating current having a frequency determined by the speed of the prime movers 10 and 20. A synchronous motor 12 is arranged to drive propeller 13. A self-excited exciter 14 having a field winding 15 and driven by a constant speed prime mover 16 is provided for exciting the field windings 17 and 27 of generators 11 and 21, respectively, and the field winding 18 of synchronous motor 12.

The proper interconnections of the generators 11 and 21 with the motor 12 and their respective field windings 17, 27 and 18 with the exciter 14 are accomplished by means of a system of switches designated as reversing and selector switches. The said switches, which in themselves constitute no part of the invention in this application and, therefore, need not herein be explained in detail, are, however, designed so that all desired interconnections may be selected for the plurality of dynamo-electric machines shown. The selection may be such that either one or both of the generators 11 and 21 may supply energy to the propeller driving motor 12 in either direction of rotation.

The fuel intake to each of the internal combustion engines 10 and 20, which engines may be of the Diesel type, is controlled by means of throttle valves 19 and 29, respectively, disposed to be operated simultaneously by a throttle operating mechanism 30 which includes a system of levers operated by a plurality of electromagnets 31 to 34, inclusive.

Not only is the speed changed by varying the fuel input but, over a range sufficient for the proper operation of a ship propulsion system, the torque developed by an internal combustion engine also varies as a function of the fuel input. To be more specific the engine torque is substantially constant for a given fuel injection. To select the desired engine speed and power input, a multi-contact switch or controller 35 is connected in circuit relation with a source of electrical energy such as a battery 36 and is disposed to be connected to a portion of the remaining control units.

To properly maintain the stability of the system, a plurality of electro-magnetic switches 37 to 40, inclusive, adapted to be operated by coils 41, 42, 43 and 44 respectively, are used. Operating coils 41, 42, 43 and 44 are disposed to be connected in parallel circuit relation with the respective coils of electromagnets 31, 32, 33 and 34 and, being connected in parallel, coil 41 will be energized simultaneously with the electromagnet 31, coil 42 will be energized simultaneously with electromagnet 32, etc. Operating coils 41 to 44, inclusive, and electromagnets 31 to 34, inclusive, are so interconnected with controller 35 that the field current of the dynamo-electric machines will increase, as the fuel intake to the internal combustion engines is increased when controller 35 is advanced from the "off" position towards position "d."

A better understanding of this invention may be had from a study of a typical sequence of operation of the system. The means for starting and the auxiliary means for controlling the internal combustion engines have been omitted because they are not a part of the invention. Assuming the internal combustion engines are in operation, and, as shown in Fig. 1 the system is operating at its lowest speed and the controller 35 is in the "off" position, at low speed, there will be a comparatively light load on the motor 12 and generators 11 and 21. The stability of the dynamo-electric machines may thus be maintained with a minimum field current, but if the field current is too high, the efficiency of the ship propulsion system will be impaired.

By the proper selection of the field-circuit constants the field current can be maintained at a value such that the load torque of the motor will be sufficiently near the pull-out torque of the motor to promote safe operation and yet obtain maximum efficiency. To limit the field current, the rheostats 51 and 61 are connected in circuit relation with generator fields 17 and 27, respectively, and similarly rheostat 71 is connected in circuit relation with motor field 18.

The field circuit for the low speed operation of generator 11 may be traced from the left-hand terminal field winding 17 through conductor 52, resistor sections 53 to 56, inclusive, of field rheostat 51, the proper circuits and apparatus of the reversing and selector switches, the exciter 14, and back through the reversing and selector switches to the right-hand terminal of the field winding 17. The field circuit of generator 21 may be traced similarly from the left-hand terminal of the generator field winding 27 through conductor 62, resistor sections 63 to 66, inclusive, of the rheostat 61, the proper circuits and apparatus of the reversing and selector switches, the exciter 14, the reversing and selector switches and back to the right-hand terminal of the field winding 27. The synchronous motor field circuit for low speed operation of motor 12 may be traced from the lower terminal of the exciter 14 to the reversing and selector switches through conductor 72, motor field winding 18, resistor sections 73 to 76, inclusive, of field rheostat 71, and the reversing and selector switches, to the upper terminal of the exciter.

To increase the speed and power output of the ship propulsion system the segment 45 of controller 35 is advanced from the off position to the left so that the portion indicated as position "a" bridges the stationary contacts 46 and 47. Electromagnet 31 of throttle operating mechanism 30 and operating coil 41 of field switch 37 are simultaneously energized. The circuit for electromagnet 31 may be traced from the positive terminal of battery 36 through the stationary contact members 46 and 47, bridged by segment 45 of controller 35, conductor 81, coil of electromagnet 31, conductor 82 and then to the negative terminal of the battery 36. The circuit for operating coil 41 may be traced from the positively energized conductor 81 through coil 41 to the negatively energized conductor 82. Electromagnet 31, being energized, thus so moves the system of levers of throttle-operating mechanism 30 that the throttle valves 19 and 29 will be operated to supply more fuel to internal combustion engines 10 and 20, respectively. The speed of the internal combustion engines and consequently the generator frequency will increase. Because of the higher frequency, the synchronous motor will drive the propeller at a higher speed and because of the nature of the medium, namely, water, in which the propeller revolves, the load on the ship propulsion system is very much increased. In order that the stability of the system may be maintained at the increased load, operating coil 41 of switch 37 will operate contact members 57, 67 and 77 to close simultaneously, thereby short-circuiting resistor sections 53, 63 and 73, respectively, thereby decreasing the resistance values of the field circuits for the fields 17, 27 and 18. As a result, the field currents are increased, thus maintaining within certain limits the ratio of load torque to pull-out torque so that the ship propulsion system will operate safely and efficiently.

If it is desired to operate the system at full speed, segment 45 of controller 35 is advanced from position "a" through positions "b" and "c" to position "d." Electromagnets 32, 33 and 34 of throttle controller 30 will be energized consecutively, and similarly operating coils 42, 43 and 44 of electromagnetic switches 38, 39 and 40, respectively, will be energized consecutively, with the coils 32 and 42 operating simultaneously as will coils 33 and 43 and coils 34 and 44.

The system of levers of throttle-operating mechanism 30 will be progressively advanced to operate throttle valves 19 and 29 so that more fuel will be admitted to the internal combustion engines 10 and 20, respectively. The contacts associated with operating coils 42, 43 and 44 of electromagnetic switches 38, 39 and 40 will close to successively short-circuit the sections of the field resistors associated with them.

For the "d" position the field circuit for generator 11 may now be traced from the reversing and selector switches through field winding 17, conductor 52, the closed contacts 57 to 60, inclusive, short-circuiting resistor sections 53 to 56, inclusive, respectively, of resistor 51 and back to the reversing and selector switches. Similarly the field circuit for generator 21, may be traced from the reversing and selector switches through the field winding 27, conductor 62, closed contacts 67 to 70, inclusive, of switches 37 to 40, inclusive, respectively, and back to the reversing and selector switches. The field circuit for synchronous motor 12 may be traced from the reversing and selector switches through conductor 72, field winding 18, closed contacts 77 to 80, inclusive, of switches 37, 38, 39 and 40, respectively, and back to the reversing and selector switches.

The resulting increase in the field currents in the dynamo-electric machines increases the value of the pull-out torque of the synchronous motor 12, thus maintaining the stability of the electric ship propulsion system by maintaining a predetermined ratio of load torque to pull-out torque.

If for any reason it should be desirable to operate at a lower speed, the movable section of the controller is moved in the direction of the "off" position. For example, if the system is operating at full speed with position "d" of the controller in engagement with the stationary contacts, and it is desirable to operate at a speed corresponding to that of position "b," the movable segment of the controller is moved from position "d," through position "c" to position "b." Electromagnets 34 and 33 are deenergized and so move the system's levers of the throttle-operating mechanism 30 that the throttle valves 19 and 29 will be operated to supply less fuel to the internal combustion engines 10 and 20, respectively, and thus decrease the speed and load on the ship propulsion system. Operating coils 44 and 43 of electromagnetic field control switches 40 and 39 respectively, are also deenergized and thus operate contacts 60, 70, 80 and 59, 69, 79 so as to decrease the excitation of the generators 11 and 21 and motor 12. Decreasing the excitation to a predetermined value in relation to the decrease in fuel supplied to the internal combustion engine does not affect the stability of the system, but results in higher efficiency.

In the modification shown in Fig. 2, corresponding elements have been given the same reference characters and only such elements as are not found in Fig. 1 are referred to by different reference characters. The important feature about the modification shown in Fig. 2 is that the operating coils 41, 42, 43 and 44 of the field control switches 37, 38, 39 and 40, respectively, are energized automatically by means of a plurality of governor contacts or circuit-closing devices 91, 92, 93 and 94, respectively, actuated by the operating mechanism of a governor controlled throttle-valve 95. The governor contacts 91, 92, 93 and 94 are so arranged that they close consecutively, and each set of governor contacts is adapted to close when the quantity of fuel supplied to the engine through throttle 95 reaches certain predetermined values. The governor contacts 91, 92, 93 and 94 are disposed to be connected to electromagnetic field control switches 37, 38, 39 and 40, respectively, to automatically vary the field current of the dynamo-electric machines 12 and 21 in relation to the fuel supplied to the internal combustion engine 20 driving the generator 21.

An electromagnetic load changing device 96 for the governor 97, controlled by a multi-contact switch or controller 98, is used to change the speed setting of the internal combustion engine 20 by increasing the spring load on the governor weights 99. With changes in the spring load, the governor weights and also the throttle-valve operating mechanism take different positions for the same speed of the engine. For example, increasing the spring load on the governor weights causes the engine to run at higher speed for all positions of the throttle-valve mechanism 100.

As shown in Fig. 2, the internal combustion engine 20 is operating at its lowest speed. As in Fig. 1, means for starting the internal combustion engine are not shown, but once the engine is in operation, the controller 98 is advanced from the off position to position "a," so that the field control switches may be energized when more field current is needed to maintain stability.

If during maneuvering the load on the system is increased, the speed of the internal combustion engine 20 will decrease. Assume that the power output of the synchronous motor 12 is constant for a certain speed determined by the frequency of the system. If an additional load is suddenly applied to the motor 12, the speed will drop momentarily so as to change the phase relation between the voltage impressed on the motor terminals and the voltage generated by the motor 12, and thus increase the armature current. As a result of this increased armature current the developed torque of the motor 12 is increased, but the speed of the generator 21 and of the internal combustion engine 20 driving it tends to decrease. As the speed tends to decrease, the governor 97 functions in such a manner as to increase the fuel supply to the internal combustion engine 21 and thus substantially maintain the speed determined by the load device 96 on the governor 97. If the load is increased to a predetermined value, the throttle-valve mechanism 100 will move so as to operate the circuit-closing device 91 to energize the operating coil 41 of the field control switch 37 and to close contacts 67 and 77, simultaneously short-circuiting resistor sections 63 and 73 respectively, thus increasing the current to the generator and motor fields 27 and 18, respectively.

The circuit to the operating coil 41 of the field control switch 37 may be traced as follows: From the positive terminal of the battery 101 through stationary contacts 102 and 103, bridged by moving segment 104 of the controller 98, conductor 105, and the operating coil 41 of the field control switch 37, conductor 106, the closed contacts of the circuit-closing device 91, and conductor 107 to the negative terminal of the battery 101.

The circuit of the field winding of the generator may be traced as follows: From exciter 14, through conductor 108, the proper circuits and apparatus of the field switches, the field winding 27, conductor 62, the closed contacts 67 of the field control switch 37, the resistor sections 64, 65 and 66 of rheostat 61, and the field switches and conductor 109 back to the exciter 14. Similarly, the circuit of the motor field winding 18 may be traced as follows: From exciter 14, through conductor 108, the circuits and apparatus of the field switches, conductor 72, field winding 18 of motor 12, closed contacts 77 of field control switch 37, resistor sections 74, 75 and 76 of the rheostat 71, field switches, and conductor 109 back to the exciter 14.

If the increase in load is only temporary as is usually the case during the maneuvering of a ship, the load will gradually decrease to its original value as the ship adjusts itself to the new condition. As the load decreases, the speed of the engine 20 tends to increase but the governor controller throttle-valve 95 functions to decrease the amount of fuel injected into the engine 20 and thus maintains the speed substantially constant. If the load should decrease below a predetermined value, one or more of the governor contacts 91, 92, 93 and 94 will function to decrease the excitation of the dynamo-electric machines 12 and 21 so as to improve the efficiency of the system.

To increase the speed of the system, movable segment 104 of the controller 98 is advanced from position "a" to position "b," and electromagnet 110 of the governor loading device 96 is then energized. The circuit may be traced as follows: From the positive terminal of battery 101, through stationary contact 102 of the controller 98, movable segment 104, stationary contact 111, conductor 112, and operating coil of electromagnet 110 back to the negative terminal of the battery 101. The electromagnet 110 so moves the system of levers of the governor loading device 96 that the tension of the spring 113 is increased and the resulting force is directed that it increases the spring load on the governor weights 99. Because of the increase in speed the engine 20 will develop more power for each position of the throttle-valve mechanism 100.

The foregoing specification is merely illustrative of the invention and applicant is aware of the fact that others skilled in the art, once having had the benefit of the teachings of this invention, can devise other circuit diagrams and further modifications without departing from the spirit of this invention. It is, therefore, to be understood that this invention is not limited to the specific modifications disclosed and is only to be limited by the scope of the appended claims and such prior art as may be pertinent.

I claim as my invention:

1. In an electric system, in combination, an engine driving a generator constituting a source of alternating current, the voltage and frequency of which may be varied, a motor electrically connected to said source, and means for automatically maintaining the stability of the system, said means comprising field control switches, a plurality of throttle-operated switches and a governor-controlled throttle valve for the engine disposed to operate the plurality of switches and electrically connected to control the field control switches.

2. In an electric system, in combination, an engine, an alternating-current generator coupled to the engine constituting a source of alternating current the voltage and frequency of which may be varied, a motor electrically connected to said source, and means for automatically maintaining the stability of the system for a plurality of engine speeds, said means including a governor, a throttle, a field control switch, a plurality of throttle-operated switches, said governor being disposed to control the throttle and the throttle being adapted to operate the plurality of switches and electrically connected to operate the field control switches.

3. In a power system, in combination, an internal-combustion engine adapted to be operated at several selectable load speeds, an electromagnetic throttle-operating mechanism for controlling the supply of fuel to the engine, a main generator driven by the engine and having a separately excited field winding, a work motor electrically connected to said generator and having a separately excited field winding, a prime mover, a constant speed self-excited exciter driven by said prime mover and disposed to supply excitation current to the field windings of the generator and the motor, rheostats for the respective generator and motor field windings, and control circuits including a plurality of multi-contact electromagnetic field control switches for simultaneously controlling the field rheostats, and a manually operable multi-contact switch for selectively energizing the electromagnetic throttle-operating mechanisms and the field control switches so as to vary the speed and load of the system and maintain the stability of the system, and a source of direct current for supplying excitation to said current control circuits.

4. In an electric system, the combination with an internal-combustion engine, an alternating current generating machine coupled to the said internal-combustion engine to thus be operated thereby, and an alternating current load driving machine electrically connected to the alternating current generating machine, a field winding being provided for at least one of the said alternating current machines, of means for maintaining the stability of the system, said means including a plurality of electromagnetic field control switches, a governor controlled throttle-valve for the internal-combustion engine, and a plurality of circuit closing devices controlled by the throttle-valve mechanism to selectively energize the said field control switches.

5. In an electric system, the combination with an internal-combustion engine, an alternating-current generating machine coupled to the said internal-combustion engine to thus be operated thereby, and an alternating-current load driving machine electrically connected to the alternating-current generating machine, a field winding being provided for at least one of the said alternating-current machines, of means for maintaining the stability of the system, said means including a plurality of electromagnetic field control switches, a governor for the internal combustion engine, a manually operable multi-contact speed selector switch, an electromagnetic loading device for the governor disposed to be electrically connected to said manually-operable multi-contact speed selector switch, a throttle-valve for the internal-combustion engine, the said throttle-valve being controlled by said governor, and a plurality of contacts controlled by the throttle-valve mechanism to selectively energize the field control switches for any speed predetermined by the closing of the said speed selector switch.

6. An electric power system including a plurality of internal-combustion engines, a plurality of generators driven thereby, the voltages and frequencies of which may be varied, a work motor disposed to be selectively interconnected with one or more generators, field windings being provided for the generators and motor and disposed to be excited when the generators and motor are selectively interconnected, a plurality of throttle-valves for the internal combustion engines, and electromagnetic means for controlling the throttle-valves, in combination with, means for maintaining the stability of the system, said means including a plurality of electromagnetic field control switches, and a plurality of circuit-making devices disposed to operate the field control switches in relation to the amount of fuel supplied to the internal combustion engines.

7. In an electric power system such as is utilized in ship propulsion, in combination, a variable-speed internal-combustion engine, a governor for the internal-combustion engine, manually controlled electromagnetic means for changing the speed setting of the governor, a throttle-valve controlled by the said governor for the internal-combustion engine, a plurality of circuit-closing devices disposed to be operated by the throttle-valve, a generator mechanically coupled to the internal-combustion engine, a propeller-driving motor electrically connected to the generator, field windings being provided for the generator and the motor, means for energizing said field windings, rheostats electrically connected to the generator and motor field windings, respectively, and a plurality of electromagnetic field control switches associated with the said rheostats and disposed to be operated by the plurality of circuit-closing devices operated by the throttle valve in such a manner that the energy to the field windings will be increased as the fuel supplied to the internal-combustion engine is increased.

WALTER SCHAELCHLIN.